(12) United States Patent
Johnson et al.

(10) Patent No.: US 11,156,447 B2
(45) Date of Patent: Oct. 26, 2021

(54) CONTINUOUS GAP MEASUREMENT

(71) Applicant: Energy, United States Department of, Washington, DC (US)

(72) Inventors: Joel A. Johnson, Rigby, ID (US); Ronald J. Heaps, Idaho Falls, ID (US)

(73) Assignee: U.S. Department of Energy, Washington, DC (US)

( * ) Notice: Subject to any disclaimer, the term of this patent is extended or adjusted under 35 U.S.C. 154(b) by 631 days.

(21) Appl. No.: 16/041,890

(22) Filed: Jul. 23, 2018

(65) Prior Publication Data

US 2020/0025549 A1    Jan. 23, 2020

(51) Int. Cl.
*G01B 7/14*    (2006.01)
*G08B 5/02*    (2006.01)
*F01D 21/00*    (2006.01)

(52) U.S. Cl.
CPC .................. *G01B 7/14* (2013.01); *G08B 5/02* (2013.01); *F01D 21/003* (2013.01)

(58) Field of Classification Search
CPC .... G01B 7/14; G08B 5/02; G21C 7/30; F01D 21/003
See application file for complete search history.

(56) References Cited

U.S. PATENT DOCUMENTS 6,124,787 A * 9/2000 Isakov ................. G01D 5/2073
340/442

\* cited by examiner

*Primary Examiner* — Amy He
(74) *Attorney, Agent, or Firm* — Felisa L. Leisinger; Michael J. Dobbs; Brian J. Lally

(57) ABSTRACT

A gap measurement device. The device has a circuit having a variable inductor and a capacitor. The variable inductor has an indicator. The device has a gap that includes a gap measurement and a gap length. The gap measurement is related to the inductance. The gap is configured to receive at least a portion of the variable inductor while the variable inductor moves along the gap length. The movement of the variable inductor along the gap length causes the inductance to change in response to the gap measurement.

17 Claims, 6 Drawing Sheets
(3 of 6 Drawing Sheet(s) Filed in Color)

600

CONTINUOUS GAP MEASUREMENT

GOVERNMENT INTERESTS

The United States Government has rights in this invention pursuant to Contract No. DE-AC07-05ID14517, between the U.S. Department of Energy and Battelle Energy Alliance.

FIELD OF THE INVENTION

The present invention relates to the continuous measurement of a gap.

BACKGROUND OF THE INVENTION

One configuration of reactor fuel plate design includes placing multiple cladded fuel plates near each other in a fuel assembly cassette. As the reactive material is consumed in the fission process, the cladded fuel plate swells indicating usage. This swelling happens in normal consumption of the fuel. When the swelling reaches a certain amount, the fuel plate must be taken out of service and new plates installed. With the fuel plates next to each other, a gap is formed that can be measured to determine the amount of swelling that has occurred based on the distance between the plates.

Currently, this gap is measured using ultrasonic transducers by measuring time-of-flight of an ultrasonic sound wave and then calculating the distance. Measuring the gap with this system is challenging due to space limitations required to accommodate the ultrasonic transducer crystals and also the changes in the temperature of the gap. The temperature must be taken into consideration in order to calculate the distance because any change in temperature affects the accuracy of the ultrasonic sound wave. Additionally, to take an accurate measurement, the instrument must dwell at each measurement location for periods of time before continuing along the length of the gap. Because many hundreds of measurements are needed to qualify each fuel plate for first-time or continued use, any delay in taking one measurement is multiplied into hundreds of delays. Therefore, there is a need for a gap measurement system that can do a continuous measurement of a gap with no dependency on temperature or measurement location dwell time.

SUMMARY OF THE INVENTION

According to one aspect of the invention, disclosed is a gap measurement device. The device has a circuit having a variable inductor and a capacitor. The variable inductor has an indicator. The device has a gap that includes a gap measurement and a gap length. The gap measurement is related to the inductance. The gap is configured to receive at least a portion of the variable inductor while the variable inductor moves along the gap length. The movement of the variable inductor along the gap length causes the inductance to change in response to the gap measurement.

In another aspect of the invention, disclosed is a method of measuring a gap. The method has the steps of first inserting at least a portion of a variable inductor into a gap. The variable inductor has an indicator and is connected to a capacitor forming an electric circuit having an inductance. The gap has a gap measurement and a gap length. The gap measurement is related to the inductance. The next step is to move the variable inductor along the gap length causing the indicator to change in response to the gap measurement. Next, the inductance of the circuit is received by a data processing unit. The data processing unit produces the gap measurement.

In another aspect of the invention, disclosed is a gap measurement system. The system comprises a gap measurement device and a data processing unit. The device has a circuit having a variable inductor and a capacitor. The variable inductor has an indicator. The device has a gap that includes a gap measurement and a gap length. The gap measurement is related to the inductance. The gap is configured to receive at least a portion of the variable inductor while the variable inductor moves along the gap length. The movement of the variable inductor along the gap length causes the inductance to change in response to the gap measurement. The data processing unit is configured to receive the inductance of the circuit and produce the gap measurement.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the present invention are illustrated in the accompanying figures where.

DETAILED DESCRIPTION OF THE INVENTION

The following detailed description provides illustrations for embodiments of the present invention. Those skilled in the art will recognize that other embodiments for carrying out or practicing the present invention are also possible. In some embodiments the present invention is a device to measure a gap. Embodiments also include a method to measure a gap. Other embodiments include a system to measure a gap.

Figure 1:
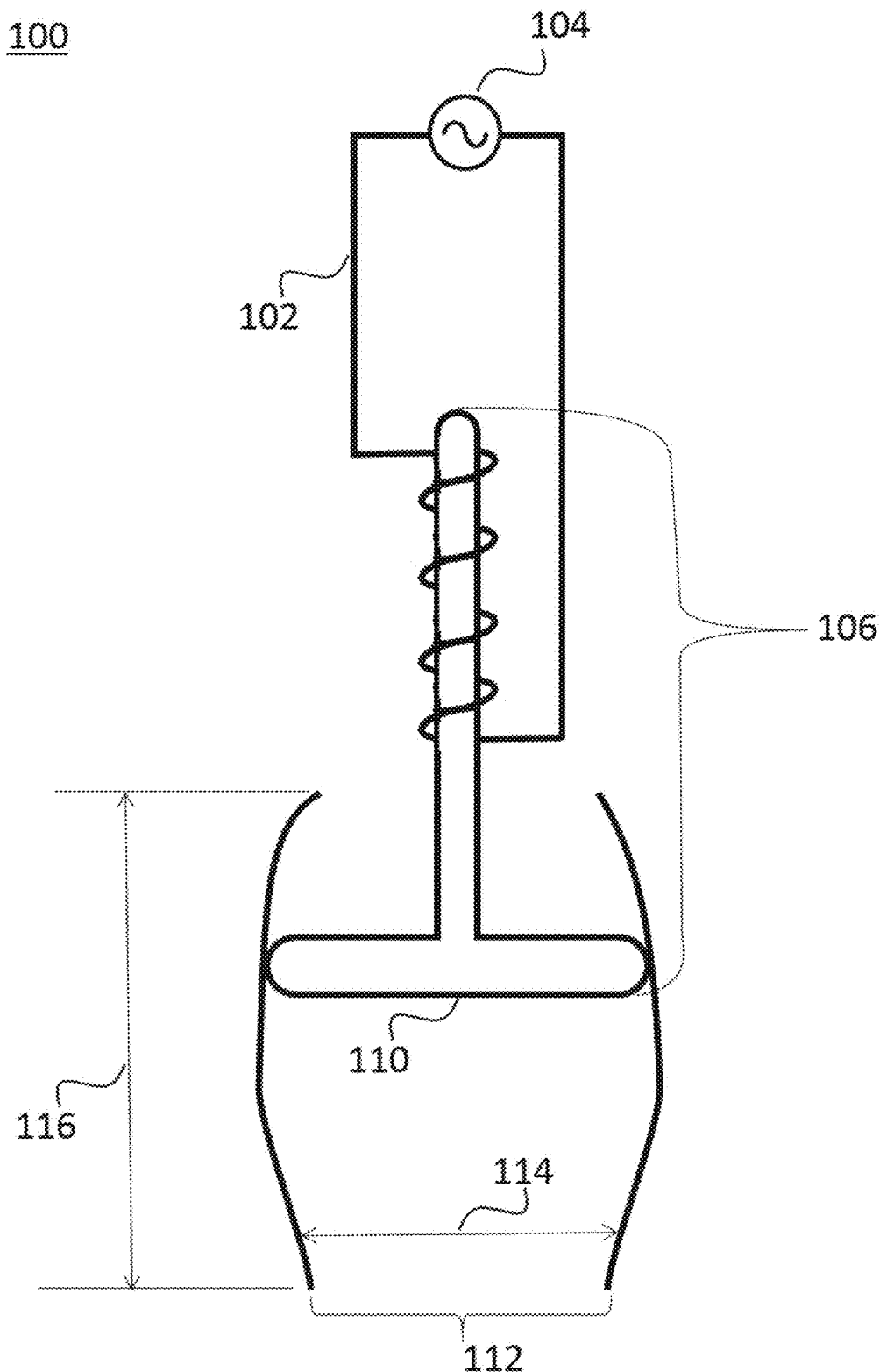
FIG. 1 is a schematic illustration of a device according to an embodiment of this invention.

Referring to FIG. 1, a schematic illustration of a gap measurement device 100 according to one embodiment of the invention is shown. The device 100 includes an electric circuit 102 that has a capacitor 104 and a variable inductor 106. The variable inductor 106 includes an indicator 110. In an embodiment, the electric circuit 102 is connected in parallel. In yet another embodiment, the electric circuit 102 is a series resonance circuit. In an embodiment the electric circuit 102 is an LC circuit, which can also be called a resonant circuit, tank circuit, or tuned circuit. The electric circuit 102 has an inductance. The value of the inductance is independent from temperature. In an embodiment, the capacitor 104 is a ceramic chip capacitor. In other embodiments, the capacitor 104 is the circuit board. In an embodiment, is a moving core inductor and the moving core is ferrofluid and the stationary external windings are a combination of copper wire and circuit board traces. The inductance of the circuit 102 is independent from temperature and, therefore, unlike prior art, the measurement of the gap 112 need not account for temperature variations encountered by the variable inductor 106.

At least a portion of the variable inductor 106 is inserted into a gap 112. The gap 112 is a break or hole in an object or between two objects. The gap 112 has a gap measurement 114 and a gap length 116. The gap measurement 114 is related to the inductace. The gap measurement 114 spans the distance of the gap 112 that is being measured. For example, the gap measurement 114 can span the distance of a break or hole in an object. Or, the gap measurement 114 can span the distance between two objects. The gap measurement 114 can be any distance. For example, the gap measurement 114 is less than approximately 10 mm. Alternate embodiments may have a gap measurement 114 as small as approximately 2 mm. In yet further embodiments, the gap measurement 114 is much larger than approximately 100 mm. The gap length 116 spans the length of the gap that the variable inductor 106 will travel. The gap length 116 is known. For example, the gap length 106 spans length of the hole or break in an object. The gap length 116 can be any distance. For example, the gap length 116 is more than approximately 0.5 m. Alternate embodiments may have a gap length 116 as small as approximately 0.1 m. In yet further embodiments, the gap length 116 is much larger than approximately 1 m. The gap length 116 and gap measurement 114 can be formed with a surface or multiple surfaces. For example, the gap 112 could be formed by two surfaces such as nuclear fuel plates or by a hollow cylinder. In an embodiment, the gap 112 is formed by gaps in the body or teeth. In any case, the unknown distance is the gap measurement 114 and the known distance, the distance along which the variable inductor will travel, is the gap length 116.

In an embodiment, the gap 112 is formed by two nuclear fuel plates. The gap measurement 114 is the distance between the two nuclear fuel plate and the gap length 116 is the distance along the fuel plates. Unlike prior art, because the gap measurement device 100 is accurate regardless of temperature variations, it can be used within a nuclear reactor without removing the nuclear fuel plates for measurement. This allows for a more efficient, in terms of time and money, measurement of swelling of the nuclear fuel plates to determine whether the nuclear fuel plates must be replaced and when.

At least a portion of the variable inductor 106 is inserted within the gap 112 and moves along the gap length 116. The movement of the variable inductor 106 is continuous. Using a slow and constant repositioning of the variable inductor 106 through the gap length 116 provides a constant inductance value through the gap length 116. The movement of the variable inductor 106 can also be a combination of placement in measured increments and constant repositioning. The speed at which the variable inductor 106 moves must only be as fast or slow as is allowed to collect the necessary inductance measurements, as explained below.

The variable inductor 106 is inserted within the gap 112 when it is far enough within the gap 112 to allow the indicator 110 accurately measure the inductance of the circuit 102 while moving along the gap length 116. In an embodiment, the entire variable inductor is inserted within the gap 112. In other embodiments, only a portion of the indicator 110 is inserted within the gap 112. In any embodiment, the indicator 110 is large enough to fill the largest gap measurement 114 the indicator 110 would encounter and indicator 110 is small enough to fill the smallest gap measurement 114 the indicator 110 would encounter. The expansion and contraction of the indicator 110 causes the inductance of the circuit 102 to change. Therefore, the inductance of the circuit 102 changes in response to the gap measurement 114.

The indicator 110 changes with the movement of the variable inductor 106 along the gap length 116 as different gap measurements 114 are encountered. For example, if the gap measurement 114 is constant through the entire gap length 116, the indicator 110 will not change. But, as the gap measurement 114 fluctuates, the indicator 110 changes in response to the fluctuation, which in turn changes the inductance of the circuit 102.

The movement of the variable inductor 106 along the gap length 116 causes no damage to the gap 112 or any surface or surrounding environment the variable inductor 106 encounters even though at least a portion of the variable inductor 106 is contacting the gap 112.

In an embodiment, the variable inductor 106 includes an indicator 110 that is a spring. The spring compresses and expands with the gap measurement 114 and changes the inductance of the circuit with each gap measurement 114 encountered.

Figure 2:
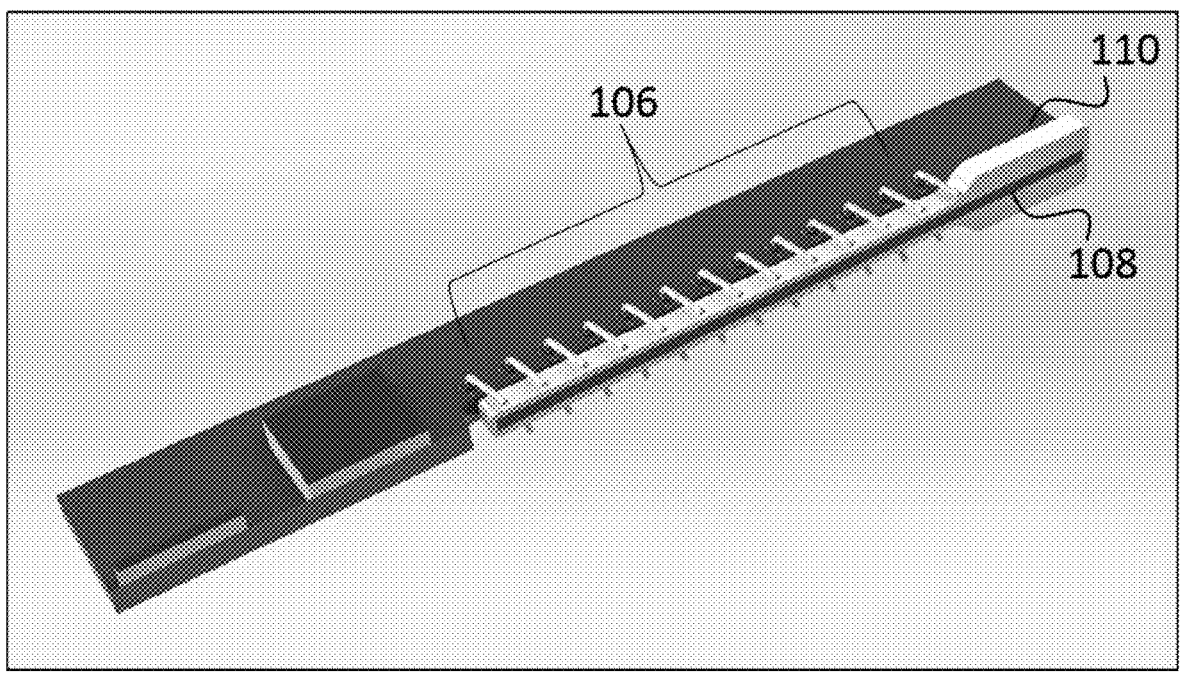
FIG. 2 is a schematic illustration of a device according to an embodiment of this invention.
Figure 3:
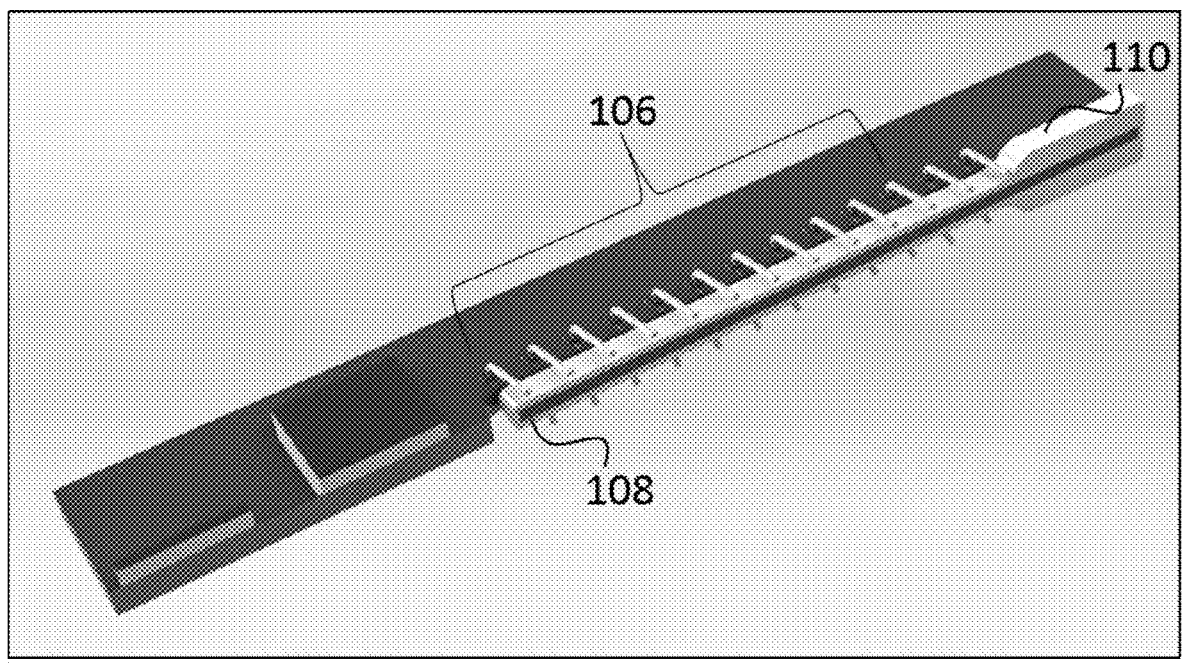
FIG. 3 is a schematic illustration of a device according to an embodiment of this invention.
Figure 4:
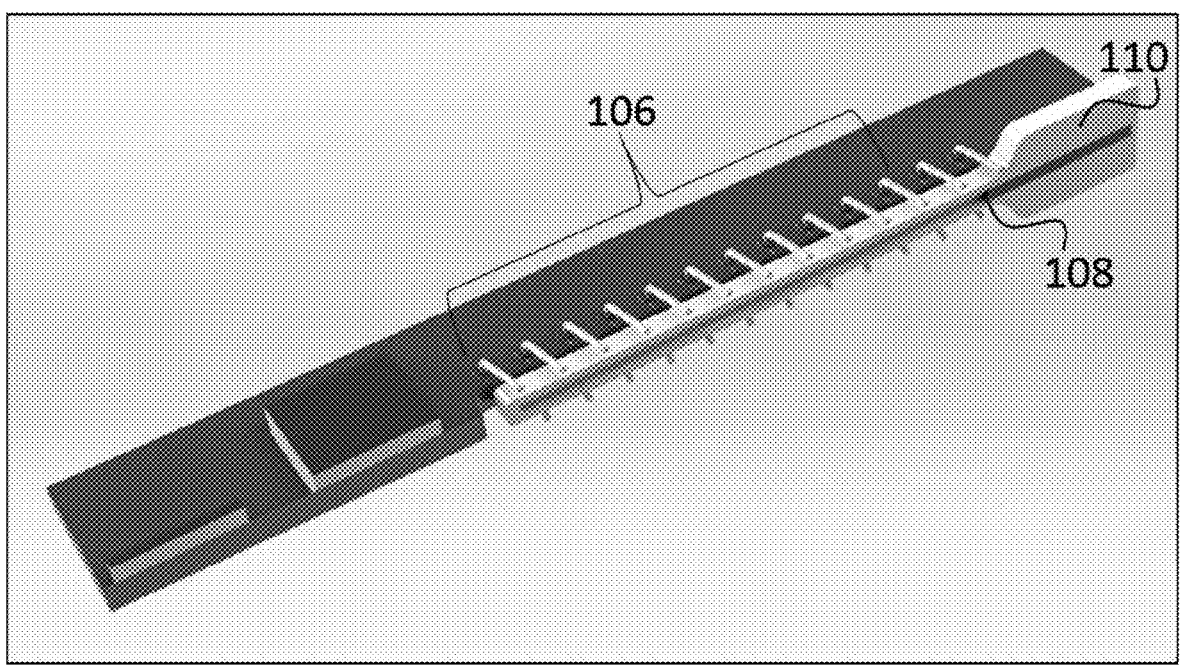
FIG. 4 is a schematic illustration of a device according to an embodiment of this invention.

In an embodiment, as shown in FIG. 2, the variable inductor 106 resembles a pipette with a coil of wire wrapped around the pipette-like tube. The bulb of the variable inductor 106 is the indicator 110, and is filled with ferrofluid 108. Ferrofluid is a substance made from nano-particles of iron suspended in an oil with a small amount of surfactant added to prevent the nano-particles from clumping together. The variable inductor 106 is assembled into a slot in a circuit board. This allows for the coil of the variable inductor 106 to be soldered to the circuit hoard around the pipette-like tube. This creates a low-cost assembly that can be constructed on modern electronic assembly equipment. Integrating the coil of the variable inductor 106 into the circuit board in this fashion also allows for management of any stray inductance that may be present which has the potential of making the gap measurements much more accurate. The indicator 110 is contained within the variable inductor 106. The indicator 110 is inserted into the gap, not pictured. As the indicator 110 moves through the gap length, not pictured, the indicator 110 expands or contracts to fill the gap measurement, also not pictured. With the expansion or contraction of the indicator 110 in response to the size of the gap measurement, ferrofluid 108 moves within the indicator 110, creating an inductor with a moving liquid core. The moving liquid core changes the inductance of the circuit in response to the gap measurement. As shown in FIG. 3, when the indicator 110 is compressed as it encounters a narrower gap measurement, not pictured, ferrofluid 108 moves within the variable inductor 106. As shown in FIG. 4, when the indicator 110 is decompressed as it encounters a wider gap measurement, not pictured, ferrofluid 108 is withdrawn into the indicator 110.

Figure 5:
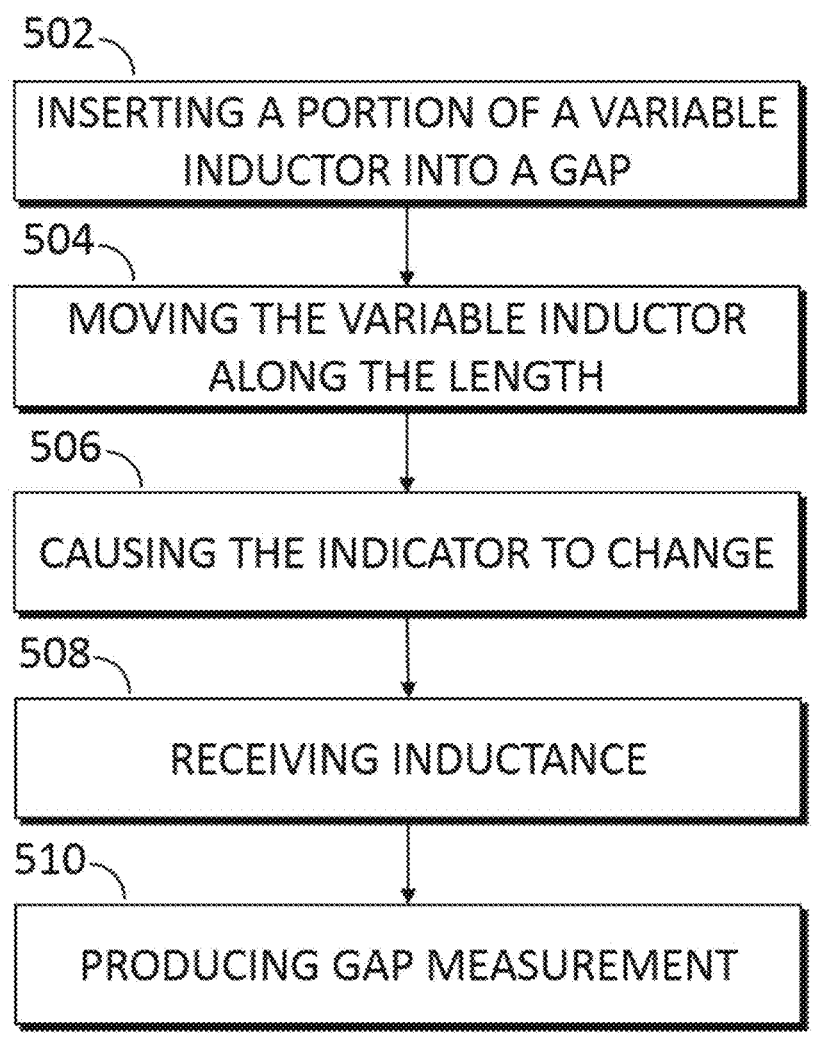
FIG. 5 is a schematic flow diagram illustrating steps in a method according to an embodiment of this invention.

Referring to FIG. 5, a schematic flow diagram illustrating the steps of a method for measuring a gap 500 is shown. First, a portion of a variable inductor is inserted into a gap, step 502. The gap has a gap measurement and a gap length. The gap measurement spans the distance of the gap and is unknown. The gap measurement can be any distance. For example, the gap measurement is less than approximately 10 mm. Alternate embodiments may have a gap measurement as small as approximately 2 mm. In yet further embodiments, the gap measurement is much larger than approximately 100 mm. The gap length spans the length of the gap that the variable inductor will travel. The gap length can be any distance. For example, the gap length is more than approximately 0.5 m. Alternate embodiments may have a gap length as small as approximately 0.1 m. In yet further embodiments, the gap length is much larger than approximately 1 m. The gap length and gap measurement can be formed with a surface or surfaces. For example, the gap could be formed by two surfaces like nuclear fuel plates or by a hollow cylinder. In any case, at least a portion of the variable inductor is inserted within the gap. The variable inductor is inserted within the gap when it is far enough within the gap to accurately take measurements while moving through the gap.

The variable inductor is connected to a capacitor forming an electric circuit. The variable inductor includes an indicator that is related to the inductance. In an embodiment, the electric circuit is connected in parallel. In yet another embodiment, the electric circuit 102 is a series resonance circuit. In an embodiment the electric circuit is an LC circuit, which can also be called a resonant circuit, tank circuit, or tuned circuit. The electric circuit has an inductance. The value of the inductance is independent from temperature. In an embodiment, the capacitor is a ceramic chip capacitor. In other embodiments, the capacitor is the circuit board. In an embodiment, is a moving core inductor and the moving core is ferrofluid and the stationary external dings are a combination of copper wire and circuit board traces. The inductance of the circuit is independent from temperature and, therefore, unlike prior art, the measurement of the gap need not account for temperature variations encountered by the variable inductor.

In step 504, the variable inductor is moved along the length of the gap. The movement along the length of the gap causes no damage to the gap or surrounding surfaces. The movement, step 104, of the variable inductor is continuous. Using a slow and constant repositioning of the variable inductor through the gap length provides a constant gap measurement value through the gap length. The movement, step 504, of the variable inductor can also be a combination of placement in measured increments and constant repositioning. The speed at which the variable inductor moves must only be as fast or slow as is allowed to collect the necessary inductance measurements, as explained below.

In any method of movement, step 504, the gap measurement remains accurate whether the variable inductor moves continuously or dwells at predetermined points along the gap length or any combination of the same. The steps of a method of measuring a gap can be repeated any desired number of times.

In step 506, the indicator changes as the variable inductor moves along the gap length. In step 508, a data processing unit receives the inductance of the circuit. In step 510, the data processing unit determines a gap measurement.

Figure 6:
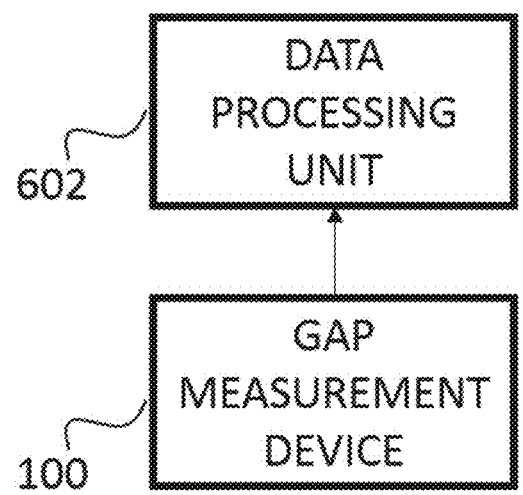
FIG. 6 is a schematic illustration of a system according to an embodiment of this invention.

Referring to FIG. 6, a schematic illustration of a gap measurement system 600 according to an embodiment of the present invention is shown. The system 600 includes at least one gap measurement device 100. One skilled in the art would recognize that the gap measurement device 100 is similar to the gap measurement device 100 and is explained in conjunction with FIG. 1.

The gap measurement system 600 includes a data processing unit 602. The data processing unit can include signal conditioning and signal acquisition circuitry. In an embodiment, the data processing unit 602 is an analog to digital converter on a microprocessor and through an algorithmic calculation, the gap measurement is determined. In an embodiment, more than one data processing unit 602 is used. In another embodiment, more than one gap measurement device 100 is used. The data processing unit 602 is configured to receive the inductance of the circuit and produce the gap measurement.

It is to be understood that, the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

Any element in a claim that does not explicitly state "means for" performing a specified function, or "step for" performing a specific function, is not to be interpreted as a "means" or "step" clause as specified in 35 U.S.C. § 112, ¶ 6. In particular, the use of "step of" in the claims herein is not intended to invoke the provisions of 35 U.S.C. § 112, ¶ 6.

The invention claimed is:

1. A continuous gap measurement device comprising:
a circuit having a variable inductor and a capacitor; the circuit having an inductance, the variable inductor having an indicator;
a gap comprising a gap measurement and a gap length, the gap measurement related to the inductance, the gap configured to receive at least a portion of the variable inductor while the variable inductor moves along the gap length, the movement along the gap length causing the inductance to change in response to the gap measurement; and
the indicator comprises a tube communicably coupled to a bulb containing a ferrofluid, the bulb configured to adjust in size in response to the gap measurement, the bulb's adjustment in size causing the ferrofluid to move within the tube whereby the inductance of the circuit changes in correlation with the gap measurement.

2. The continuous gap measurement device of claim 1 wherein the gap further comprises at least one surface.

3. The continuous gap measurement device of claim 2 wherein the variable inductor causes no damage to the gap as it moves along the gap length.

4. The continuous gap measurement device of claim 1 wherein the gap is comprised of at least two nuclear fuel plates, each nuclear fuel plate separated by a gap measurement.

5. The continuous gap measurement device of claim 1 wherein the gap measurement is less than approximately 10 mm.

6. The continuous gap measurement device of claim 1 wherein the gap length is less than approximately 0.5 m.

7. The continuous gap measurement device of claim 1 further comprises a data processing unit configured to receive the inductance of the circuit and produce the gap measurement.

8. A method of measuring a gap, the method comprising the steps of:
(a) inserting at least a portion of a variable inductor into a gap, the variable inductor having an indicator, the indicator comprises a tube communicably coupled to a bulb containing a ferrofluid, the variable inductor connected to a capacitor forming an electric circuit having an inductance, the gap having a gap measurement and a gap length, the gap measurement related to the inductance;
(b) moving the variable inductor along the gap length causing the inductance to change in response to the gap measurement, the bulb configured to adjust in size in response to the gap measurement, the bulb's adjustment in size causing the ferrofluid to move within the tube whereby the inductance of the circuit changes in correlation with the gap measurement; and (c) receiving the inductance in a data processing unit whereby the data processing unit produces the gap measurement.

9. The method of claim 8 further including repeating the steps (b)-(c) a number of times.

10. The method of claim 8 wherein said step of moving the variable inductor along the gap length causes no damage to the gap.

11. The method of claim 8 wherein the gap further comprises at least one surface.

12. The method of claim 8 wherein the gap is comprised of at least two nuclear fuel plates, each nuclear fuel plate separated by a gap measurement.

13. The method of claim 8 wherein the gap measurement is less than approximately 10 mm.

14. The method of claim 8 wherein the gap length is less than approximately 0.5 m.

15. A continuous gap measurement device comprising:

a circuit having a variable inductor and a capacitor, the circuit having an inductance, the variable inductor having an indicator;

a gap comprising a gap measurement and a gap length, the gap measurement related to the inductance, the gap configured to receive at least a portion of the variable inductor while the variable inductor moves along the gap length, the movement along the gap length causing the inductance to change in response to the gap measurement; and the indicator comprises a spring, the spring configured to adjust in size in response to the gap measurement, the spring's adjustment in size causes the inductance of the circuit to change in correlation with the gap measurement.

16. The continuous gap measurement device of claim 15 wherein the gap is comprised of at least two nuclear fuel plates, each nuclear fuel plate separated by a gap measurement.

17. The continuous gap measurement device of claim 15 further comprises a data processing unit configured to receive the inductance of the circuit and produce the gap measurement.

* * * * *